July 18, 1933.    G. A. HANDY    1,918,539
BEAD STRUCTURE FOR PNEUMATIC TIRES
Filed June 3, 1931
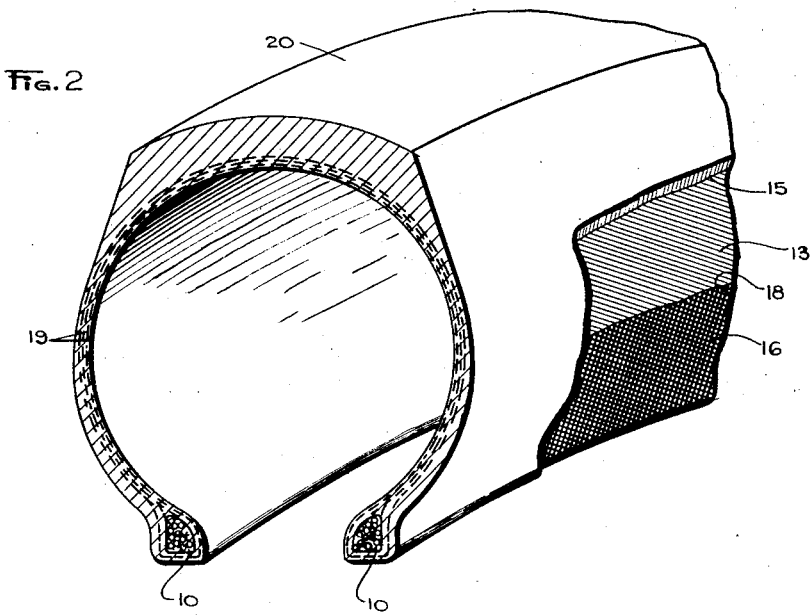
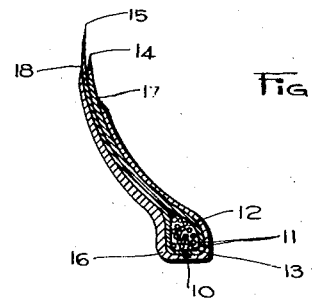
Inventor
George A. Handy
By
Attorney Patented July 18, 1933

1,918,539

UNITED STATES PATENT OFFICE

GEORGE A. HANDY, OF AKRON, OHIO, ASSIGNOR TO THE GOODYEAR TIRE & RUBBER COMPANY, OF AKRON, OHIO, A CORPORATION OF OHIO

BEAD STRUCTURE FOR PNEUMATIC TIRES

Application filed June 3, 1931. Serial No. 541,938.

This invention relates to the manufacture of pneumatic tires and it has particular relation to the bead and sidewall construction of such tires.

An object of the invention is to provide an improved sidewall structure for tires which is more durable under excessive flexure caused by sustained loads and prolonged use than those structures which have heretofore been employed.

A further object is to provide a sidewall structure of increased flexibility and consequently of increased durability.

Other objects and advantages will become apparent from the following description.

Pneumatic tires, as ordinarily manufactured, comprise relatively thick tread portions of only slight flexibility and comparatively flexible sidewalls which are provided on their inner peripheries with inextensible beads serving to maintain the tires upon the rims of the wheels on which they are used. Since the tread portions of tires are of such slight flexibility, the major portion of the flexure of tires in use occurs in the sidewall region and if the sidewalls are not properly reinforced about the beads, they may be sharply flexed or bent about the flanges of the rims upon which they are mounted. This sharp flexure, if repeated, may result in a rupture of the fabric of the tire adjacent the upper edges of the flanges of the rim.

This objectionable feature has heretofore been overcome, at least to a considerable extent, by wrapping strips or flippers of relatively heavy cross-woven fabric about the beads in such manner that the margins of the strips project upwardly from the beads and are incorporated into the sidewalls of the tire. These upwardly projecting marginal portions of the strips serve to reinforce and stiffen the lower portion of the sidewalls of the tire and thus prevent, as much as possible, sharp flexure of the sidewalls about the flanges of the rim. While this construction greatly reduces sharp sidewall flexure, it has not completely eliminated this source of trouble, either because the cross-woven fabric produces excessive rigidity of the sidewalls of the tires, or because the cords, in this type of fabric, that are interwoven with each other, permit only a slight degree of movement without resulting in excessive frictional chafing.

In order to overcome this difficulty, or at least to substantially improve upon prior constructions, the present invention contemplates the provision of a bead structure in which a strip of cord fabric, which comprises parallel cords that may or may not be bound together by means of very weak threads or filaments, or a similar fabric, is employed as an inner flipper strip and is covered by an outer flipper strip composed of ordinary cross-woven fabric.

In the accompanying drawing I have shown one embodiment of the invention by way of illustration. In the drawing:

Fig. 1 is a sectional view of a bead and flipper strips associated therewith; and Fig. 2 is a fragmentary perspective view of a tire constructed in accordance with the invention, parts being broken away.

In practicing the invention, a conventional bead 10 is formed and preferably comprises a plurality of metallic filaments or wires 11, embedded in spaced relation in a rubber compound 12, to provide an inextensible bead or core. The bead, in this instance, is then enclosed in an inner ply 13 of cord fabric of conventional construction (and preferably bias-cut), which extends outwardly of the bead a substantial distance to become an integral part of the sidewall of a tire. These extended portions of the ply 13 overlie each other and in reality provide a double thickness of cord fabric entering into the makeup of the adjacent sidewall of the tire, the cords of one thickness crossing those of the other thickness by reason of the doubling back of the material over the bead. The longitudinal edges 14 and 15 of the ply are preferably arranged in stepped relation, as shown in Fig. 1, giving a desirable gradation of flexibility in the sidewall.

An outer ply 16 of cross-woven fabric is then folded about the ply 13 with its edge portions also extending outwardly to become part of the sidewall of the tire, said extended portions of the ply 16 engaging the similar portions of the ply 13 to form a flipper strip of four plies with the cord fabric plies disposed between and preventing engagement of the cross-woven fabric plies. The longitudinal edges 17 and 18 of the ply 16 are likewise arranged in stepped relation with respect to each other and with respect to the edges of the ply 13, as clearly shown in Fig. 1. This stepped relation of the edges of the plies provides substantially a tapered or feathered flipper strip which becomes an integral part of a tire carcass without forming any pronounced ridges therein, but giving the gradation of flexibility previously referred to.

Since the specific steps of applying the various plies of fabric to the beads are well known in the art, it is not believed necessary to describe the method and apparatus used for this purpose. However, it is to be understood that the number of plies of fabric employed may be increased so long as the relationship between the core and square woven fabric is maintained whereby no engagement is permitted between plies of square woven fabric.

In Fig. 2 I have shown a fragment of a complete tire embodying the invention and the tire, in this instance, comprises a plurality of plies 19 of cord fabric stitched together in any ordinary or preferred manner and covered with a relatively heavy tread portion 20. Other elements, such as chafing strips, breaker strips, cushion gums and the like, also go into the makeup of the tire, but need not be referred to in detail. The relation of the bead and flipper strip described herein, with respect to the complete tire, is clearly shown in Fig. 2, as is the stepped relation of the edges of the plies. In a finished tire the beads and flipper strips, as well as the other elements, become an integral part of the tire when vulcanized, as will be understood. Also, it is customary to arrange the various plies of fabric both in the carcass and in the flipper strips whereby the cords of each ply will diagonally cross the cords of the next adjacent ply, as shown in Fig. 2, but it is not intended that this invention shall be limited to such an arrangement of cords.

The bead and flipper strip are customarily referred to as the bead portion of the tire. When the inner covering of the bead is formed of cord fabric while the outer covering is of cross-woven fabric, the latter fabric imparts the requisite degree of rigidity to the flipper, while the cord fabric, which is disposed between the edges of the cross-woven fabric, prevents engagement between the portions of the latter fabric. The cords in the cord fabric, because they are not woven together as in the cross-woven fabric, have a substantial degree of movement with respect to each other and there is but slight tendency of the cords to chafe or cut each other. The cord fabric thereby constitutes a cushion between the plies of cross-woven fabric and permits flexure of the latter without the destructive chafing of one ply upon another. Moreover, the cord fabric plies also increase the rigidity of the sidewalls of the tires in which they are incorporated. However, it will be apparent that the invention is not necessarily limited to the use of cord fabric as a means for preventing destructive chafing between the plies of fabric, and any suitable fabric may be used which will accomplish this purpose, although experiments have proven cord fabric to be particularly well suited for the purpose.

Therefore, the improved bead portion herein described possesses the requisite rigidity to prevent sharp flexure of the sidewalls of the tires about the flanges of the rims and at the same time, the presence of the cord fabric permits normal flexure of the sidewalls without rupture or internal chafing of the fabric in the flipper strip and around the bead.

It is to be understood that the form of the invention herewith shown and described is to be taken as a preferred example of the same, and that various changes in the shape, size and arrangements of parts may be made without departing from the spirit of the invention or the scope of the subjoined claims.

What I claim is:

1. In a bead structure for use in a pneumatic tire casing, a substantially circular inextensible member, a covering therefor comprising a strip of cross-woven fabric surrounding said member and having its margins extending outwardly therefrom, and an intermediate layer of cord fabric between said margins.

2. In a bead structure for use in a pneumatic tire casing, a substantially circular inextensible member, a cover therefor comprising a strip of cross-woven fabric surrounding said member and having its margins extending outwardly therefrom, and an intermediate layer of more elastic fabric between said margins.

GEORGE A. HANDY.